United States Patent [19]

Moser et al.

[11] Patent Number: 5,731,359

[45] Date of Patent: Mar. 24, 1998

[54] VIBRATION-ABSORBING ELEMENTS

[75] Inventors: Rene Moser, Chur, Switzerland; Hans-Jurgen Lesser, Rheinfelden, Germany

[73] Assignees: A. Raymond GmbH & Co. KG, Germany; EMS-Inventa AG, Switzerland

[21] Appl. No.: 498,147

[22] Filed: Jul. 5, 1995

[30] Foreign Application Priority Data

Aug. 11, 1994 [DE] Germany ............. 44 28 520.5

[51] Int. Cl.$^6$ ..................................... C08J 9/34
[52] U.S. Cl. ............. 521/51; 521/143; 521/146; 521/148; 521/149; 521/150; 521/183; 521/184; 521/185; 267/140.11; 267/141
[58] Field of Search ................. 521/51, 143, 146, 521/148, 149, 150, 183, 184, 185; 267/140.11, 141

[56] References Cited

U.S. PATENT DOCUMENTS

| | | | |
|---|---|---|---|
| 3,211,605 | 10/1965 | Spaak et al. | 521/51 |
| 3,363,870 | 1/1968 | Olsen . | |
| 3,384,691 | 5/1968 | Weissman et al. | 521/51 |
| 4,028,287 | 6/1977 | Sato et al. . | |
| 4,544,594 | 10/1985 | Li et al. | 264/54 |
| 4,604,409 | 8/1986 | Gagliani et al. | 521/157 |
| 4,940,629 | 7/1990 | Weber et al. | 428/213 |
| 4,960,549 | 10/1990 | Brook et al. | 264/54 |
| 5,091,572 | 2/1992 | Speranza et al. | 528/340 |
| 5,130,382 | 7/1992 | Speranza et al. | 525/420 |
| 5,138,097 | 8/1992 | Speranza et al. | 564/153 |

FOREIGN PATENT DOCUMENTS 0062835  10/1982  European Pat. Off. .
 150994   9/1994  Germany .

OTHER PUBLICATIONS

Technical Service, Jon Menough, Dec. 1986, pp. 12 & 13
Die Kunststoffe und ihre Eigenschaften (8 pgs) Article.
Produktbroschure GE Spezialprodutke, Boehringer Ingelheim, Aug. 1991.
Introduction to Expancel Microspheres, Nobel Industries Swede Mar. 1991.
Produktbroshure PTS–Produktvorschlag Schwingungsdamper 1990.
Saechtling: Kunststoff Taschenbuch 25, Ausgabe, Hanser Verlag 1992 S. 335, 336.

*Primary Examiner*—John M. Cooney, Jr.
*Attorney, Agent, or Firm*—Bierman, Muserlian and Lucas

[57] ABSTRACT

A vibration-absorbing element comprised of a foamed thermoplastic polymer selected from the group consisting of polyamide elastomers, EPDM polymers and SEBS polymers containing conventional additives, the foam structure having a pore size which decreases from the inside towards the outer surface and terminating in a smooth closed surface.

8 Claims, 4 Drawing Sheets

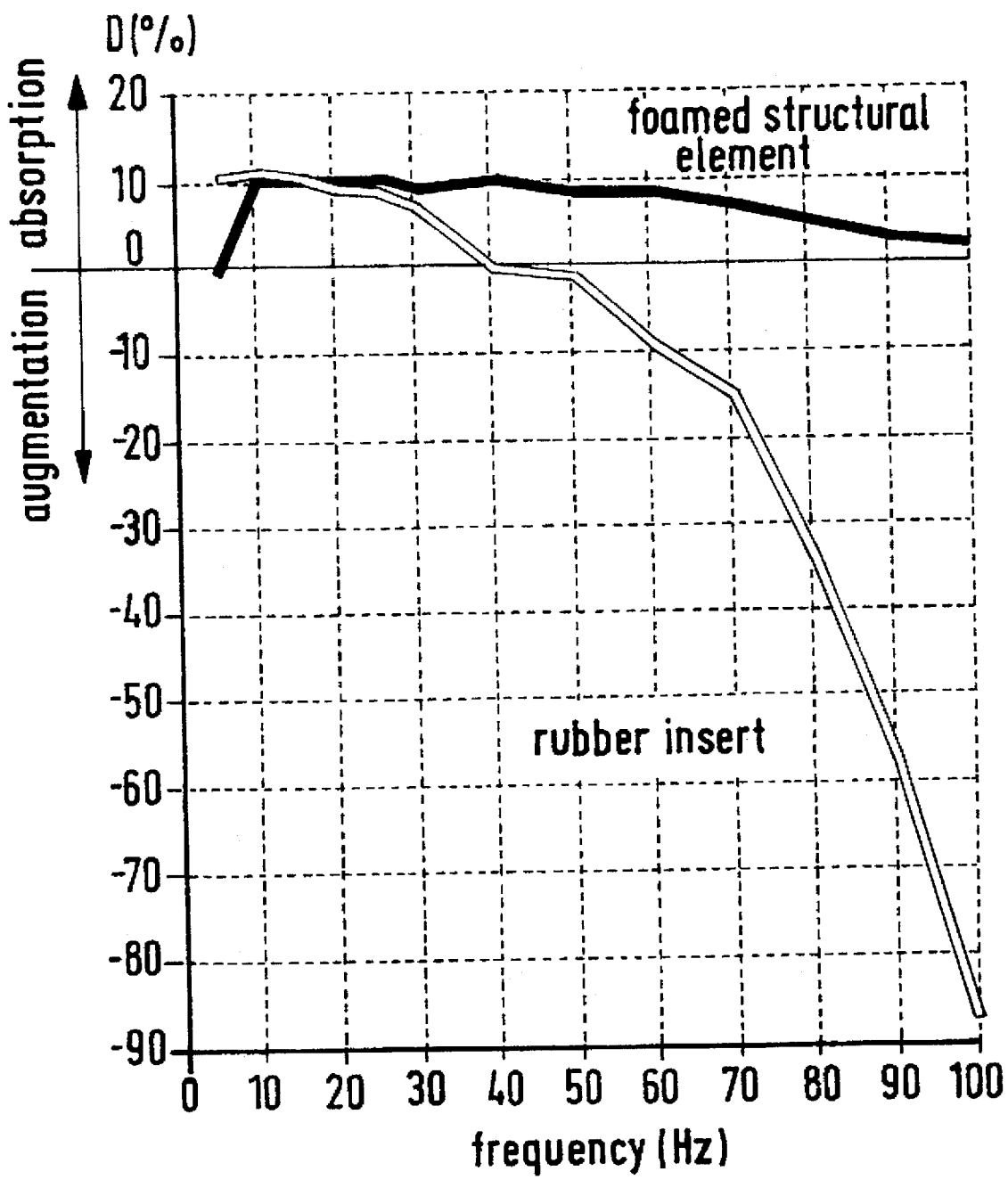

VIBRATION-ABSORBING ELEMENTS

STATE OF THE ART

Absorbing members are used where either the supporting underside is subjected to strong vibrations or where the objects to be supported are themselves subjected to vibrations. They are also used for sound and noise absorption. An example of this is the placing of rigid lines in motor vehicle construction where vibrations are generated through pumps connected to the lines. The transmission of these vibrations in the chassis is undesirable due to the noise development connected therewith and is to be avoided through the use of absorption members.

Looking to the prior art, there are known some different kinds of vibration-absorbing line holders. FIG. 5A shows a line holder comprising flexible members (8) with complicated forms. Another kind of line holder (FIG. 5B) comprises two materials with a soft component (9) being inserted into a hard component (10), preferably by bonding. A further line holder as shown in FIG. 5C comprises a rubber insert (11).

More recent developments comprise constructions in which hard and soft components (10) and (9) are joined in a so-called two-component injection molding process (2K). The latter implementations entail the disadvantage that through the use of two different materials and the process of joining, their production is expensive.

OBJECTS OF THE INVENTION

It is an object of the invention to provide an absorption element which avoids the prior art disadvantages and has better overall absorption properties.

It is another object of the invention to provide an absorption element made of a uniform material and which are economically produced.

These and other objects and advantages of the invention will become obvious from the following detailed description.

THE INVENTION

The vibration-absorbing element of the invention is comprised of a foamed thermoplastic polymer selected from the group consisting of polyamide elastomers, EPDM polymers (ethylene-propylene-diene elastomer) and SEBS polymers (styrol-ethylene-butylene-styrol block copolymer) containing conventional additives, the foam structure having a pore size which decreases from the inside towards the outer surface and terminating in a smooth closed surface.

The element of the invention has a foam structure increasingly more refined from the inside to the outside and the differences in density due to this leads from a soft-vibration-absorbing core with increasing hardening-absorbing to a largely closed surface of the seal member.

The structural or functional member of the invention comprises a thermoplastic foamed polymer, particularly elastomer polyamide, EPDM and SEBS, with polyether polyamides and polyetherester polyamides based on polyamide 6 and polyamide 12 being especially preferred.

The advantages of the structural or functional elements of the invention are: excellent absorption properties compared to the prior art, favorable force expenditure during mounting of a structural or functional member when pressing onto a threaded bolt, excellent stability against chemicals in the motor vehicle field and against effects of climate, high resistance to breaking and impact, and the ability to function from 120° C. to −40° C. as well as producibility in a simple and, consequently, cost-effective injection mold by a simple injection molding process with only one starting polymer substance.

The structural or functional element of the invention is advantageously produced preferably through an injection molding processing parameter tuned precisely to a suitable expanding agent. Its largely closed surface is attained through low mold temperatures which advantageously, due to the formed part, are below 50° C.

Structural or functional elements of the invention can be used, for example, as fastening elements for rigid lines such as brake lines or fuel lines in motor vehicle construction, as mounting plates or as undercovering as well as lining material.

BRIEF DESCRIPTION OF THE DRAWINGS

FIG. 4. is a graph of the vibration absorption of a foamed structural or functional element of the invention and a formed part with rubber insert of the prior art, and FIG. 5. (A), (B) and (C) are cross-sections of three line holders of the prior art.

In FIG. 1, line holder 1 of the invention serves for receiving and for the vibration-absorbing support of line pipes (2) and (3). Line holder (1) is provided at its center with a receiving bore (4) for fastening onto a threaded bolt (5) which is welded or otherwise fastened on a carrier plate (6). As is evident in particular in FIG. 2, the line holder is produced of thermoplastic synthetic material, and specifically of a foamed polymer whose foam structure has a pore size decreasing from the inside toward the outside, and terminates in a largely smooth surface (7). The pore size is usually between 85 and 2000 µm, and the density connected therewith is between 0.5 and 0.95 g/cm³.

The foamed polymers of the invention are preferably selected from the group of polyamide elastomers, of EPDM and SEBS polymers with polyether polyamides or polyetherester polyamides based on PA 6 and PA 12 being especially preferred in connection with 1 to 7 percent by weight, preferably 1 to 5 percent by weight, especially preferred 1 to 3 percent by weight, of suitable expanding agents. The amount of expanding agent whose base is a modified azodicarbonamide must be adjusted to the size and shape of the structural or functional element.

The foamed polymers of the invention can be modified with additives known to one skilled in the art, particularly they can be equipped so as to be flame-resistant or heat-stable.

Figure 1:
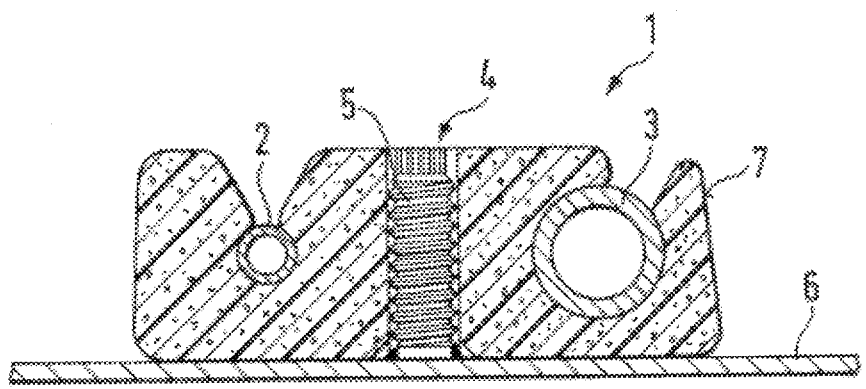
FIG. 1. is a cross-section of a line holder produced from structural foam of the invention with a receiving part for fastening onto a threaded bolt.
Figure 2:
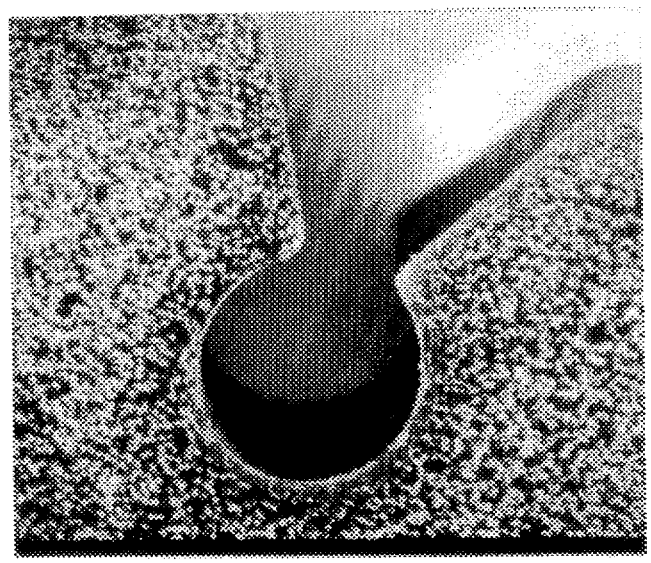
FIG. 2. is an enlarged partial cross-section through the line holder of FIG. 1.
Figure 3:
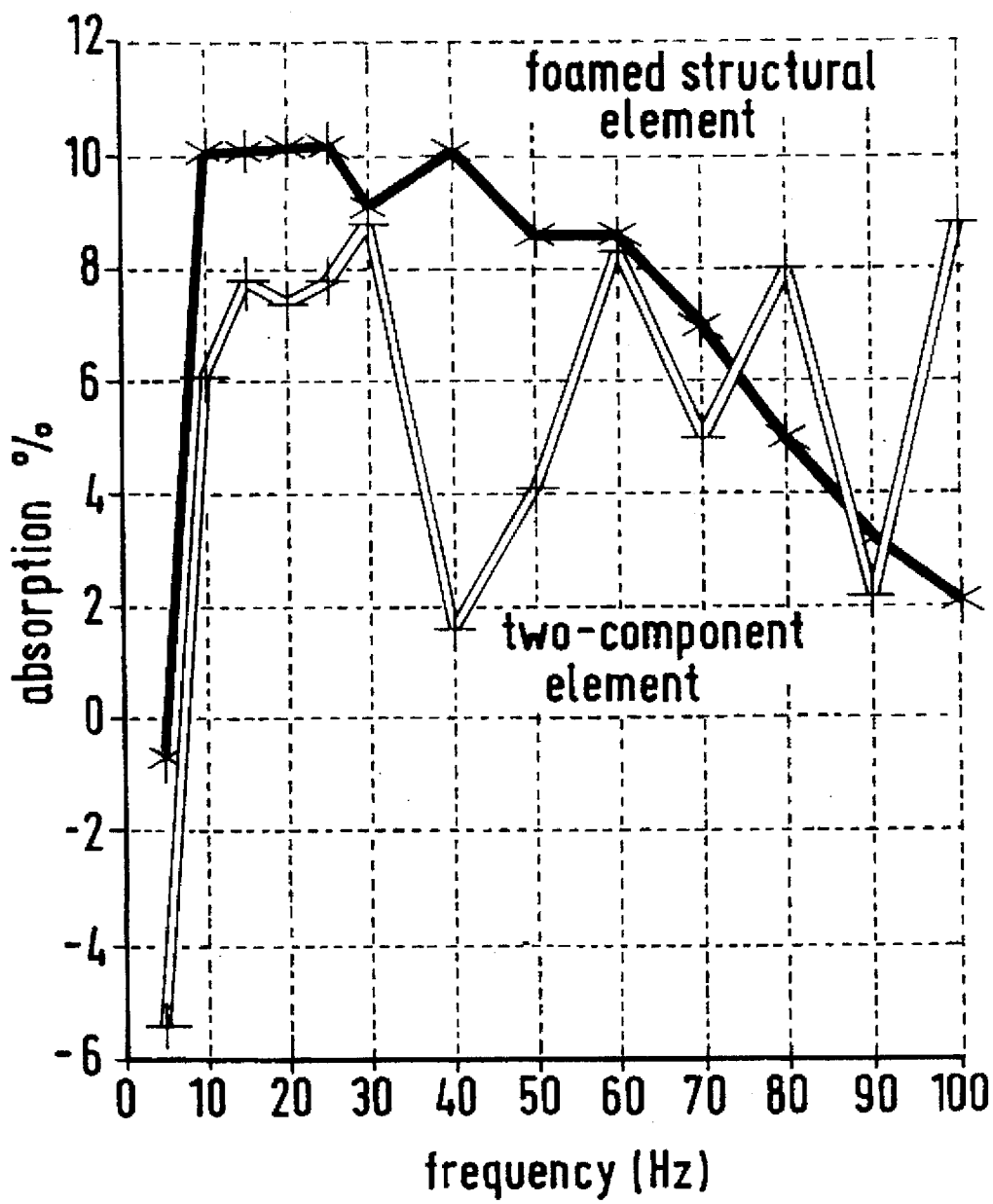
FIG. 3. is a graph of the vibration absorption of a foamed structural or functional element of the invention and a two-component formed element of the prior art.
Figure 5A:
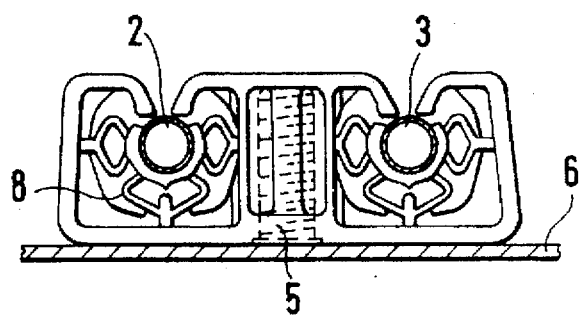
Figure 5B:
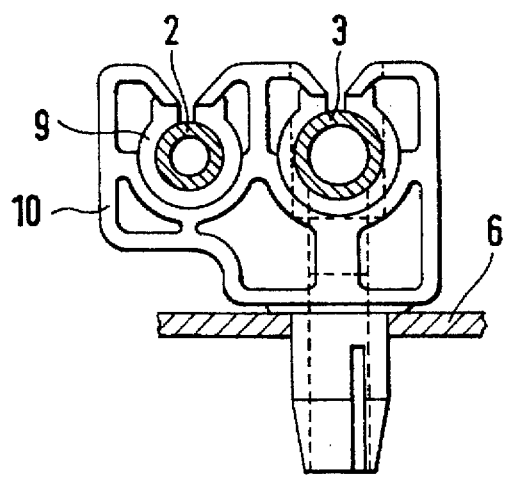

FIG. 3 illustrates the absorption behavior of a structural foam element of the invention and a two-component formed element (2K) of FIG. 5B. As can be seen on the basis of the profile of the curve, the structural foam element of the invention has a very homogeneous absorption behavior in the range from 10 to 100 Hz. In comparison, the 2K element has somewhat poorer absorption behavior between 7 and 70 Hz with a marked drop at 40 Hz.

Figure 5C:
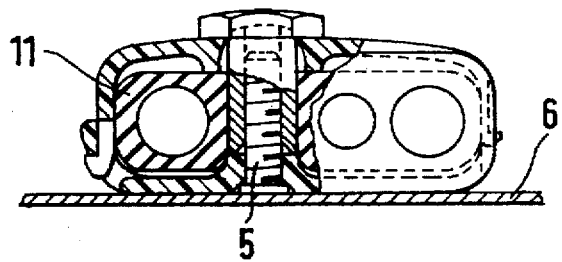

FIG. 4 illustrates the absorption behavior of a structural or functional element of the invention in comparison with an identical formed element with a rubber insert element (11) of FIG. 5C. As is evident on the basis of the profile of the curve, in the case of the rubber element, the absorption decreases beginning at 30 Hz and then, beginning at 40 Hz, even changes over into a vibration augmentation. In comparison, the absorption behavior of the structural or functional element of the invention is nearly constant from 10 to 40 Hz and is only gradually impaired beginning at 60 Hz.

Further confirmation of the excellent absorption behavior of the structural or functional member according to the invention results from the infra described impedance test in which vibration generators were coupled to a fastening member via an impedance measuring head. The fastening member was disposed by means of a mounting on a heavy mounting plate. The impedance measuring head measured the introduced force and the resulting vibration acceleration at the site of introduction. On that basis, the impedance could be determined, which is a measure of the dynamic rigidity of the fastening members at the site of excitation. At low impedance, a relatively low generator force is capable of triggering large vibration movements.

The impedance was composed of resistance and reaction. The resistance described an absorber proportional to speed and indicated the body sonic power absorbed by absorption. The dissipation factor served to characterize the absorption which detects the energy component referred to a period of the vibration which was converted into heat by absorption.

|  | Formed Element with Rubber Insert | Structural or Functional Element of Invention |
| --- | --- | --- |
| f(r) (Hz) | 1100 | 4000 |
| R (kg/s) | 42 | 20 |
| η % | ≈35 | 7 |
| R min at 0–2000 Hz | R > 42 | R > 43 | f(r) frequency at which the fastening member had a resonance locus, i.e. at which it could be set into vibration
R resistance
η absorption at resonance
R min minimum resistance in the frequency range considered between 0 to 2000 Hz.

As the test has demonstrated, the resistance of the structural or functional element of the invention is up to 1400 Hz higher than that of the prior art element with a rubber insert. The absorption in the range of interest between 0 and 2000 Hz was excellent.

The structural or functional elements of the invention are used in the production of fastening members, particularly line holders, in mounting plates, lining and absorption formed parts.

Various modifications of the elements of the invention may be made without departing from the spirit or scope thereof and it is to be understood that the invention is to be limited only as defined in the appended claims.

What we claim is:

1. A vibration-absorbing member selected from the group consisting of line holders, fastening members, mounting plates, lining elements and absorption elements which comprises the vibration-absorbing element consisting essentially of a foamed thermoplastic polyamide elastomer selected from the group consisting of polyetherester polyamide and polyether-polyamide, both based on polyamide 6 or polyamide 12 and polypropylene ether diamine, containing additives, the foam structure having a pore size in the range of from 85 to 2000 μm which decreases gradually from the inside towards the outer surface and terminates in a smooth closed surface and a density of from 0.5 to 0.95 g/cm³.

2. The member of claim 1 having a mean degree of expansion of 5 to 50%.

3. The member of claim 1 wherein the thermoplastic polymer is selected from the group consisting of a polyetherester polyamide and a polyether polyamide, both based on polyamide 6 or polyamide 12.

4. The member of claim 1 wherein the thermoplastic polymer is a polyetherester polyamide based on polyamide 12 and polypropylene ether diamine.

5. An element of claim 1 wherein the thermoplastic polymer is expanded by an expanding agent used in an amount of 1 to 7% by weight.

6. The member of claim 1 wherein the thermoplastic polymer contained 1 to 5% by weight of an expanding agent.

7. The member of claim 1 wherein the thermoplastic polymer contained 1 to 3% by weight of an expanding agent.

8. The member of claim 1 containing a fire-retardant.

* * * * *